(12) United States Patent
Earhart et al.

(10) Patent No.: US 8,038,564 B2
(45) Date of Patent: Oct. 18, 2011

(54) MULTI-SPEED TRANSMISSION (75) Inventors: David Earl Earhart, Brownsburg, IN (US); James A. Raszkowski, Indianapolis, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/008,654

(22) Filed: Jan. 18, 2011

(65) Prior Publication Data
US 2011/0118074 A1    May 19, 2011

Related U.S. Application Data (62) Division of application No. 11/832,490, filed on Aug. 1, 2007, now Pat. No. 7,896,770.

(51) Int. Cl.
*F16H 37/02*    (2006.01)
(52) U.S. Cl. .......... 475/218; 475/207; 475/302; 74/330; 74/331; 74/340
(58) Field of Classification Search .......... 74/330, 74/331, 340; 475/207, 218, 302
See application file for complete search history.

(56) References Cited

U.S. PATENT DOCUMENTS

| | | |
|---|---|---|
| 6,176,803 B1 | 1/2001 | Meyer |
| 6,342,026 B1 | 1/2002 | Takagi |
| 6,547,688 B2 | 4/2003 | Takagi |
| 6,736,751 B1 | 5/2004 | Usoro |
| 6,743,139 B1 | 6/2004 | Usoro |
| 6,743,140 B1 | 6/2004 | Lee |
| 6,743,142 B1 | 6/2004 | Lee |
| 6,743,143 B1 | 6/2004 | Usoro |
| 6,743,144 B1 | 6/2004 | Lee |
| 6,746,357 B1 | 6/2004 | Usoro |
| 6,752,736 B1 | 6/2004 | Lee |
| 6,755,765 B2 | 6/2004 | Usoro |
| 6,758,784 B2 | 7/2004 | Lee |
| 6,758,787 B2 | 7/2004 | Usoro |
| 6,764,424 B1 | 7/2004 | Usoro |
| 6,764,425 B2 | 7/2004 | Lee |
| 6,764,426 B2 | 7/2004 | Usoro |
| 6,767,307 B1 | 7/2004 | Lee |
| 6,811,512 B2 | 11/2004 | Usoro |
| 6,837,823 B2 | 1/2005 | Lee |
| 6,852,059 B2 | 2/2005 | Lee |
| 6,960,149 B2 | 11/2005 | Ziemer |
| 7,011,597 B2 | 3/2006 | Haka |
| 7,014,589 B2 | 3/2006 | Stevenson |
| 7,128,683 B2 | 10/2006 | Oguri |
| 7,163,484 B2 | 1/2007 | Klemen |
| 7,597,644 B2* | 10/2009 | Rodgers, II ............. 74/325 |
| 7,621,839 B2* | 11/2009 | Jackson .................. 74/330 |
| 2006/0019791 A1 | 1/2006 | Baldwin |
| 2006/0270514 A1 | 11/2006 | Oguri |
| 2006/0270516 A1 | 11/2006 | Klemen |
| 2009/0036247 A1 | 2/2009 | Earhart |

* cited by examiner

*Primary Examiner* — David D Le
*Assistant Examiner* — Derek D Knight (57) ABSTRACT

A transmission is provided having an input member, an output member, a dual clutch assembly, two countershaft gearing arrangements, one planetary gear set, a plurality of interconnecting members, and a plurality of torque transmitting devices. Each of the countershaft gearing arrangements includes a plurality of co-planar gear sets. The torque transmitting devices include a combination of clutches, brakes, and synchronizers.

27 Claims, 7 Drawing Sheets

FIG. 1

| RANGE | GEAR RATIO | RATIO STEP | TORQUE TRANSMITTING ELEMENTS |
|---|---|---|---|
| REV L | 8.68 | | 94/2R/114 |
| REV H | 2.53 | | 94/2R/112 |
| 1 | 7.40 | | 92/1A/114 |
| 2 | 5.44 | 1.36 | 94/2A/114 |
| 3 | 4.00 | 1.36 | 92/1B/114 |
| 4 | 2.94 | 1.36 | 94/2B/114 |
| 5 | 2.16 | 1.36 | 92/1A/112 |
| 6 | 1.59 | 1.36 | 94/2A/112 |
| 7 | 1.17 | 1.36 | 92/1B/112 |
| 8 | 1.00 | 1.17 | 110/112 |
| 9 | 0.86 | 1.17 | 94/2B/112 |
| | | | |
| RC | 8.63 | | |

FIG. 2

| RANGE | GEAR RATIO | RATIO STEP | TORQUE TRANSMITTING ELEMENTS |
|---|---|---|---|
| REV L | 8.68 | | 94/2R/114 |
| REV H | 2.53 | | 94/2R/112 |
| 1 | 7.40 | | 92/1A/114 |
| 2 | 5.71 | 1.30 | 94/2A/114 |
| 3 | 4.41 | 1.29 | 92/1B/114 |
| 4 | 3.43 | 1.29 | 110/114 |
| 5 | 2.67 | 1.28 | 94/2B/114 |
| 6 | 2.16 | 1.24 | 92/1A/112 |
| 7 | 1.67 | 1.30 | 94/2A/112 |
| 8 | 1.29 | 1.29 | 92/1B/112 |
| 9 | 1.00 | 1.29 | 110/112 |
| 10 | 0.78 | 1.28 | 94/2B/112 |
| | | | |
| RC | 9.51 | | |

| RANGE | GEAR RATIO | RATIO STEP | TORQUE TRANSMITTING ELEMENTS |
|---|---|---|---|
| REV L | 7.33 | | 94/2R/114 |
| REV H | 2.14 | | 94/2R/112 |
| 1 | 6.35 | | 92/114 |
| 2 | 4.65 | 1.37 | 94/2A/114 |
| 3 | 3.43 | 1.35 | 110/114 |
| 4 | 2.53 | 1.36 | 94/2B/114 |
| 5 | 1.85 | 1.36 | 92/112 |
| 6 | 1.36 | 1.37 | 94/2A/112 |
| 7 | 1.00 | 1.35 | 110/112 |
| 8 | 0.74 | 1.36 | 94/2B/112 |
| RC | 8.62 | | |

| RANGE | GEAR RATIO | RATIO STEP | TORQUE TRANSMITTING ELEMENTS |
|---|---|---|---|
| REV L | 10.03 | | 94/2R/114 |
| REV H | 2.93 | | 94/2R/112 |
| 1 | 8.65 | | 92/1A/114 |
| 2 | 6.35 | 1.36 | 94/2A/114 |
| 3 | 4.65 | 1.37 | 92/1B/114 |
| 4 | 3.43 | 1.35 | 110/114 |
| 5 | 2.52 | 1.36 | 92/1A/112 |
| 6 | 1.85 | 1.36 | 94/2A/112 |
| 7 | 1.36 | 1.37 | 92/1B/112 |
| 8 | 1.00 | 1.36 | 110/112 |
| RC | 8.65 | | |

FIG. 7

| RANGE | GEAR RATIO | RATIO STEP | TORQUE TRANSMITTING ELEMENTS |
|---|---|---|---|
| REV L | 5.16 | | 94/2R/114 |
| REV H | 1.68 | | 94/2R/112 |
| 1 | 4.45 | | 94/2A/114 |
| 2 | 3.07 | 1.45 | 110/114 |
| 3 | 2.13 | 1.44 | 94/2B/114 |
| 4 | 1.45 | 1.47 | 94/2A/112 |
| 5 | 1.00 | 1.45 | 110/112 |
| 6 | 0.69 | 1.44 | 94/2B/112 |
| RC | 6.41 | | |

MULTI-SPEED TRANSMISSION

CROSS-REFERENCE TO RELATED APPLICATIONS

This application is a divisional application of U.S. application Ser. No. 11/832,490 filed on Aug. 1, 2007. The disclosure of the above application is incorporated herein by reference.

FIELD

The present disclosure relates to transmissions, and more particularly to a multiple speed transmission having a dual clutch assembly and dual countershafts.

BACKGROUND

The statements in this section merely provide background information related to the present disclosure and may or may not constitute prior art.

A typical multi-speed, dual clutch transmission employs a plurality of clutches to achieve a plurality of forward and reverse gear ratios. These dual clutch transmissions are typically employed in front-wheel drive applications. Additionally, a slipping clutch is employed to transmit launch torque from an engine to the transmission in order to achieve a high power-to-weight ratio that is desirable in non-commercial vehicles.

While useful for its intended purpose, these conventional multi-speed dual clutch transmissions do not have the range of torque and available gear ratios necessary to be employed in commercial vehicles or trucks. Additionally, the addition of clutches, brakes, and gear sets to achieve these gear ratios and torque ranges may result in inefficient or undesirable transmission weights and sizes. Accordingly, there is a need in the art for a transmission having improved packaging while providing desirable gear ratios and torque ranges.

SUMMARY

The present invention provides a transmission having an input member, an output member, a dual clutch assembly, two countershaft gearing arrangements, one planetary gear set, a plurality of interconnecting members, and a plurality of torque transmitting devices. Each of the countershaft gearing arrangements includes a plurality of co-planar gear sets. The torque transmitting devices include a combination of clutches, brakes, and synchronizers.

In one aspect of the present invention the torque transmitting devices include two clutches, one brake, and three synchronizers to provide at least nine forward gear ratios.

In another aspect of the present invention the torque transmitting devices include two clutches, one brake, and three synchronizers to provide at least ten forward gear ratios.

In yet another aspect of the present invention the torque transmitting devices include two clutches, one brake, and two synchronizers to provide at least eight forward gear ratios with overdrive.

In yet another aspect of the present invention the torque transmitting devices include two clutches, one brake, and two synchronizers to provide at least eight forward gear ratios with an overdrive.

In yet another aspect of the present invention the torque transmitting devices include two clutches, one brake, and two synchronizers to provide at least eight forward gear ratios without an overdrive.

In still another aspect of the present invention the countershafts are radially outward from and parallel to the input member.

In still another aspect of the present invention the planetary gear set is co-axial with the input member.

In still another aspect of the present invention one interconnecting member is concentric with another interconnecting member.

In still another aspect of the present invention the transmission includes a torque converter continuously connected with the input member.

In still another aspect of the present invention the dual clutch assembly includes a first clutch for selectively connecting the input member with a first countershaft and a second clutch for selectively connecting the input member with a second countershaft.

The present invention also provides a transmission having an input member, an output member, a countershaft gearing arrangement, one planetary gear set, a plurality of interconnecting members, and a plurality of torque transmitting devices. The countershaft gearing arrangement includes a plurality of co-planar gear sets. The torque transmitting devices include a combination of clutches, brakes, and synchronizers.

In one aspect of the present invention the torque transmitting devices include three clutches, one brake, and two synchronizers to provide at least six forward gear ratios.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
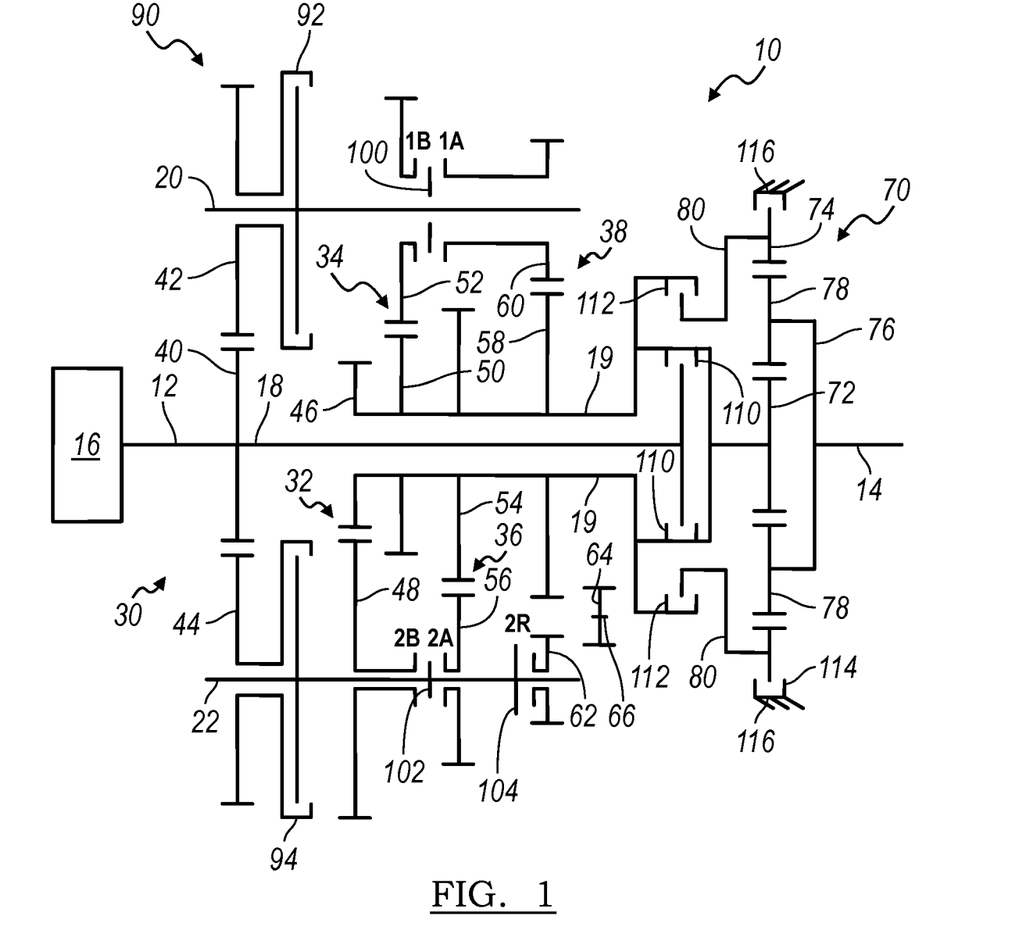
FIG. 1 is a diagrammatic view of a nine speed and ten speed embodiment of the transmission according to the principles of the present invention.

With reference to FIG. 1, a stick diagram presents a schematic layout of a multi-speed transmission for use in a motor vehicle, generally indicated by reference number 10. The transmission 10 is preferably a longitudinal dual clutch transmission (DCT). The transmission 10 includes an input shaft or member 12 and an output shaft or member 14. Those skilled in the art will appreciate that the input and output members 12, 14 may be components other than shafts without departing from the scope of the present invention. The input member 12 is continuously connected to a turbine of a torque converter 16. The output member 14 is continuously connected with a final drive unit or transfer case (not shown) in the motor vehicle.

The transmission 10 further includes intermediate shafts, countershafts, co-planar intermeshing gear sets, and selectively engagable synchronizers and clutches as will be described herein. For example, the transmission 10 includes a first intermediate or interconnecting member 18, a second intermediate or interconnecting member 19, a first layshaft or countershaft 20, and a second layshaft or countershaft 22. The second intermediate member 19 is preferably a sleeve shaft that is at least partially concentric with the first intermediate member 18. The countershafts 20, 22 are both spaced radially outward from and parallel with the input shaft 12, the output shaft 14, and the intermediate members 18, 19.

The first gear set 30 includes a gear 40, a gear 42, and a gear 44. Gear 40 is connected for common rotation with the input shaft 12 and intermeshed with gear 42 and gear 44. Gear 42 is rotatable about and selectively connectable with the first countershaft 20. Gear 44 is rotatable about and selectively connectable with the second countershaft 22.

The second gear set 32 includes a gear 46 and a gear 48. Gear 46 is connected for common rotation with the second intermediate member 19 and is intermeshed with gear 48. Gear 48 is rotatable about and selectively connectable with the second countershaft 22.

The third gear set 34 includes a gear 50 and a gear 52. Gear 50 is connected for common rotation with the second intermediate member 19 and is intermeshed with gear 52. Gear 52 is rotatable about and selectively connectable with the first countershaft 20.

The fourth gear set 36 includes a gear 54 and a gear 56. Gear 54 is connected for common rotation with the second intermediate member 19 and is intermeshed with gear 56. Gear 56 is rotatable about and selectively connectable with the second countershaft 22.

The fifth gear set 38 includes a gear 58, a gear 60, and a gear 62. Gear 58 is connected for common rotation with the second intermediate member 19 and is intermeshed with gear 60 and an idler gear 64. Gear 60 is rotatable about and selectively connectable with the first countershaft 20. The idler gear 64 is connected for common rotation with an independent shaft or pinion 66. The idler gear 64 is intermeshed with gear 62. Gear 62 is rotatable about and selectively connectable with the second countershaft 22.

The transmission further includes a high/low splitter gear set 70 located between the shafts 12, 14, 18, and 19 and the output shaft 14. The splitter gear set 70 is preferably a simple planetary gear set having a sun gear member 72, a ring gear member 74, and a planet carrier member 76 which rotatably supports a set of pinion gears 78 which intermesh with both the sun gear member 72 and the ring gear member 74. The sun gear member 72 is connected for common rotation with the second intermediate member 19. The ring gear member 74 is connected for common rotation with a third intermediate or interconnecting member 80. The planet carrier member 76 is connected for common rotation with the output member 14.

The transmission further includes a dual clutch arrangement 90 for selectively coupling the input shaft 12 to one of the first and second countershafts 20, 22. More specifically, the dual clutch arrangement 90 includes a first clutch 92 and a second clutch 94. The first clutch 92 is selectively engageable to connect gear 42 of the first gear set 30 with the first countershaft 20. The second clutch 94 is selectively engageable to connect gear 44 of the first gear set 30 with the second countershaft 22. The first and second clutches 92, 94 are preferably coplanar and radially offset from the input member 12. However, it should be appreciated that the clutches 92, 94 may be in various other positions relative to one another without departing from the scope of the present invention.

A plurality of coupling mechanisms including a first synchronizer 100, a second synchronizer 102, and a third synchronizer 104 allow for selective interconnection of the gears 48, 52, 56, 60, 62 with the countershafts 20, 22. The synchronizers 100, 102, 104 generally include a shift fork (not shown) that is bi-directionally translated by an actuator (not shown). For example, the first synchronizer 100 may be translated to the left (position 1B in FIG. 1) to synchronize the speed of the first countershaft 20 with the speed of gear 52 and couple it thereto or moved to the right (position 1A in FIG. 1) to synchronize the speed of the first countershaft 20 with the speed of gear 60 and couple it thereto. The second synchronizer 102 may be translated to the left (position 2B in FIG. 1) to synchronize the speed of the second countershaft 22 with the speed of gear 48 and couple it thereto or moved to the right (position 2A in FIG. 1) to synchronize the speed of the second countershaft 22 with the speed of gear 56 and couple it thereto. The third synchronizer 104 may be translated to the right (position 2R in FIG. 1) to synchronize the speed of the second countershaft 22 with the speed of gear 62 and couple it thereto.

A plurality of torque-transmitting mechanisms including a third clutch 110, a fourth clutch 112, and a first brake 114 allow for selective interconnection of the intermediate members 18, 19, 80 with the members of the high/low splitter gear set 70 and a ground, stationary element, or a transmission housing 116. For example, the third clutch 110 is selectively engageable to connect the first intermediate member 18 with the second intermediate member 19. The fourth clutch 112 is selectively engageable to connect the second intermediate member 19 with the third intermediate member 80. The first brake 114 is selectively engageable to connect the ring gear member 74 with a ground or the transmission housing 116 in order to restrict the ring gear member 74 from rotating relative to the ground or transmission housing 116. The clutches 110, 112 and the brake 114 are preferably hydraulically actuated friction clutches as is known in the art. Additionally, the third clutch 110 is preferably concentric with the fourth clutch 112 and radially inward therefrom in order to reduce the size of the transmission 10.

Figure 2:
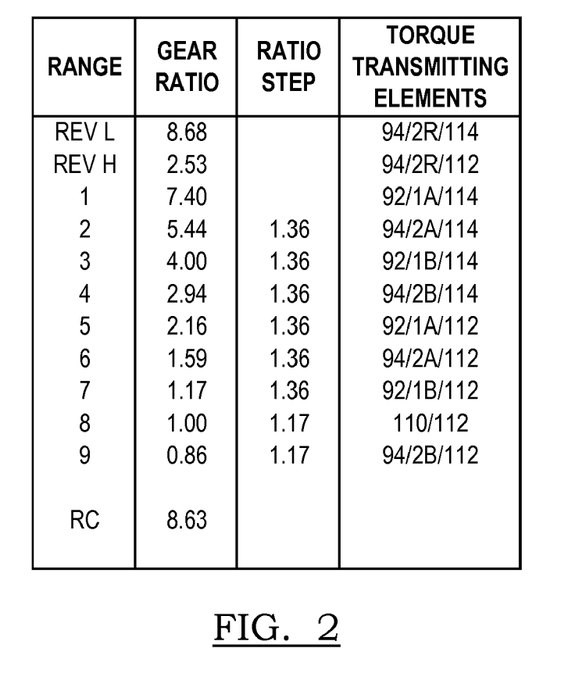
FIG. 2 is a chart listing the torque transmitting elements that are engaged to achieve exemplary gear ratios and step ratios for the nine speed embodiment of the transmission of the present invention.

Referring now to FIGS. 1 and 2, the operation of the embodiment of the transmission 10 will be described. It will be appreciated that the transmission 10 is capable of transmitting torque from the input shaft 12 to the output shaft 14 in at least nine forward speed or torque ratios and at least two reverse speed or torque ratios. Each forward and reverse speed or torque ratio is attained by engagement of one or more of the torque-transmitting mechanisms (i.e. first synchronizer 100, second synchronizer 102, third synchronizer 104, first clutch 92, second clutch 94, third clutch 110, fourth clutch 112, and first brake 114), as will be explained below. FIG. 2 is a truth table presenting the various combinations of torque-transmitting mechanisms that are activated or engaged to achieve the various gear states. In the particular example provided, "1A", "1B", "2A", "2B", and "2R" refer to the positions of the synchronizers 100, 102, 104 as described above and illustrated in FIG. 1. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 2. Of course, other gear ratios are achievable depending on the gear diameter, gear teeth count and gear configuration selected.

To establish reverse gear low, the second clutch 94 and the first brake 114 are engaged or activated and the third synchronizer 104 is in the 2R position. The second clutch 94 connects gear 44 with the second countershaft 22. The first brake 114 connects the ring gear member 74 with the ground or transmission housing 116. The third synchronizer 104 synchronizes gear 62 with the second countershaft 22. Likewise, the reverse gear high and the nine forward ratios are achieved through different combinations of clutch and brake engagement and synchronizer position, as shown in FIG. 2.

Figure 3:
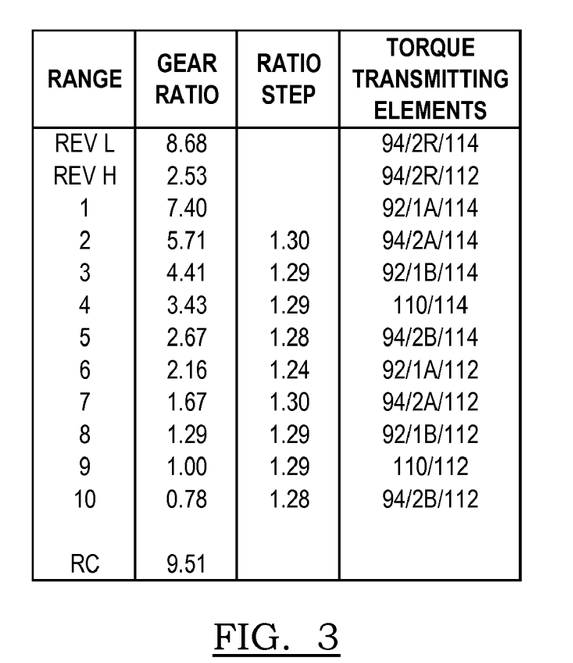
FIG. 3 is a chart listing the torque transmitting elements that are engaged to achieve exemplary gear ratios and step ratios for the ten speed embodiment of the transmission of the present invention.

With reference to FIGS. 1 and 3, and alternate embodiment of the transmission 10 may be achieved by changing the number of intermeshing teeth on the gear sets and by including at least one additional clutching combination. For example, FIG. 3 is a truth table presenting a ten-speed embodiment of the transmission 10 employing various combinations of the torque-transmitting mechanisms that are activated or engaged to achieve at least ten forward speed or torque ratios and at least two reverse speed or torque ratios. In the particular example provided, "1A", "1B", "2A", "2B", and "2R" refer to the positions of the synchronizers 100, 102, 104 as described above and illustrated in FIG. 1. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

Figure 4:
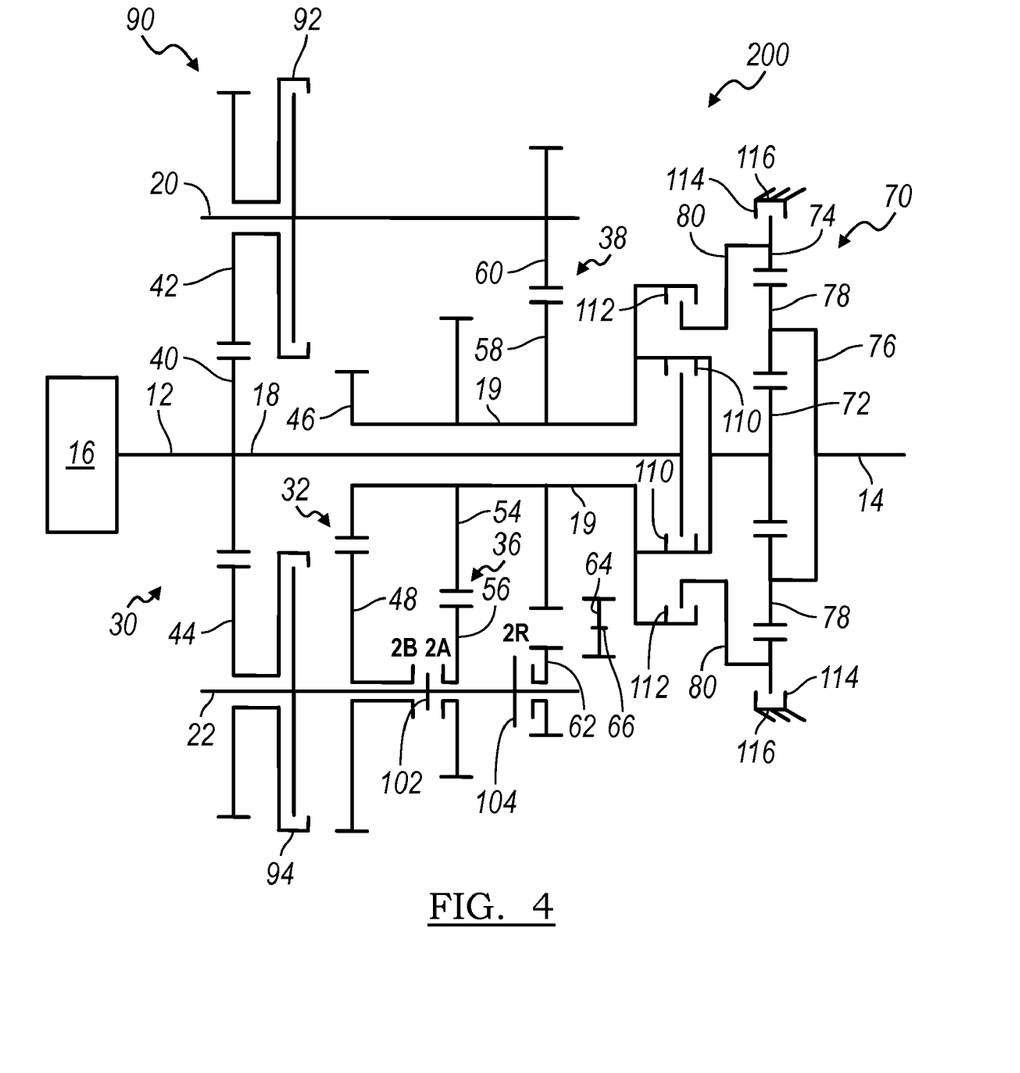
FIG. 4 is a diagrammatic view of an eight speed embodiment of the transmission according to the principles of the present invention.

Turning now to FIG. 4, an alternate embodiment of the transmission 10 is shown and generally indicated by reference number 200. The transmission 200 is similar to the transmission 10 and accordingly like parts are indicated by like reference numbers. However, the transmission 200 does not include the third co-planar gear set 34 and the first synchronizer 100. Additionally, gear 60 is directly rotatingly coupled to the first countershaft 20.

Figure 5:
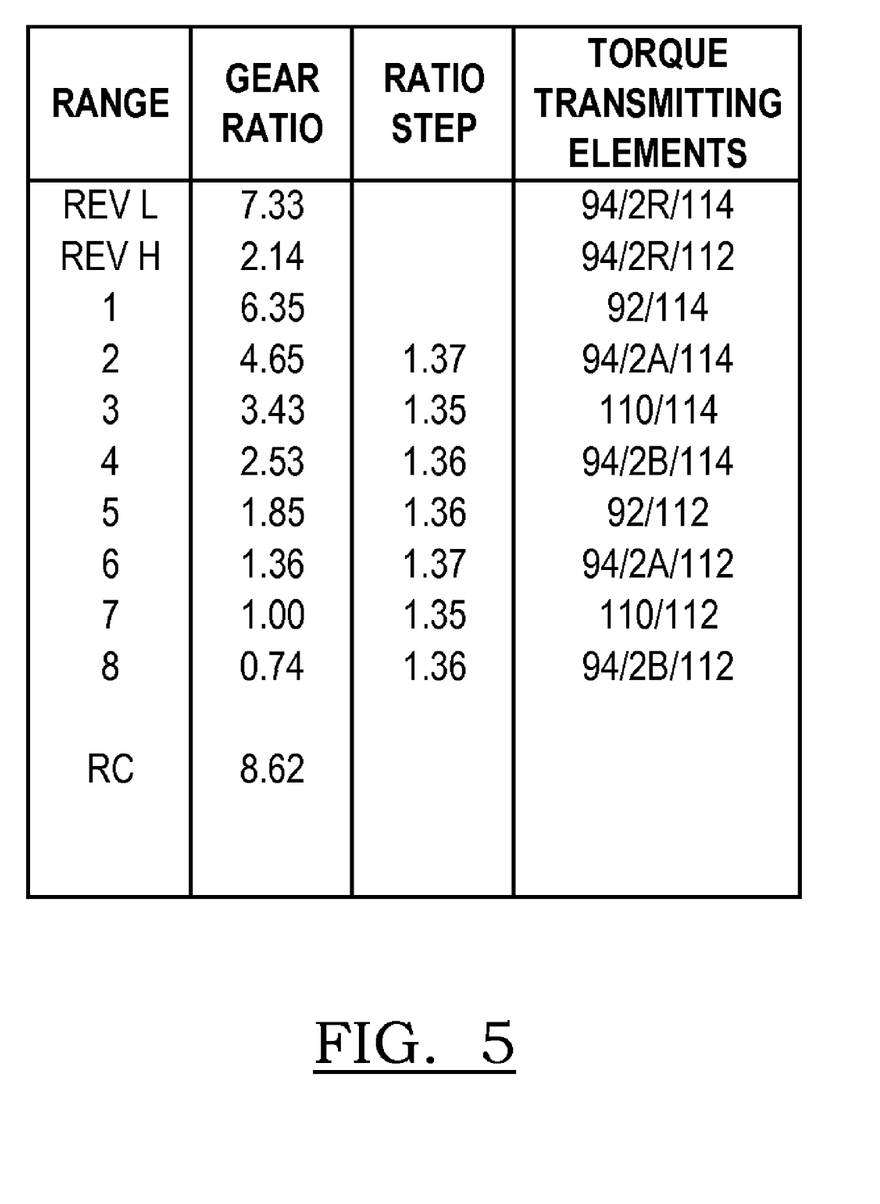
FIG. 5 is a chart listing the torque transmitting elements that are engaged to achieve exemplary gear ratios and step ratios for the eight speed embodiment of the transmission of the present invention.

With reference to FIGS. 4 and 5, the transmission 200 is an 8-speed transmission with overdrive and is operable to provide at least eight forward speed or torque ratios and at least two reverse speed or torque ratios. FIG. 5 is a truth table presenting the various combinations of the torque-transmitting mechanisms that are activated or engaged to achieve the eight forward speed or torque ratios and the two reverse speed or torque ratios in the eight-speed transmission 200. In the particular example provided, "2A", "2B", and "2R" refer to the positions of the synchronizers 102, 104 as described above and illustrated in FIG. 4. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 5. Of course, other gear ratios are achievable depending on the gear diameter, gear teeth count and gear configuration selected.

Figure 6:
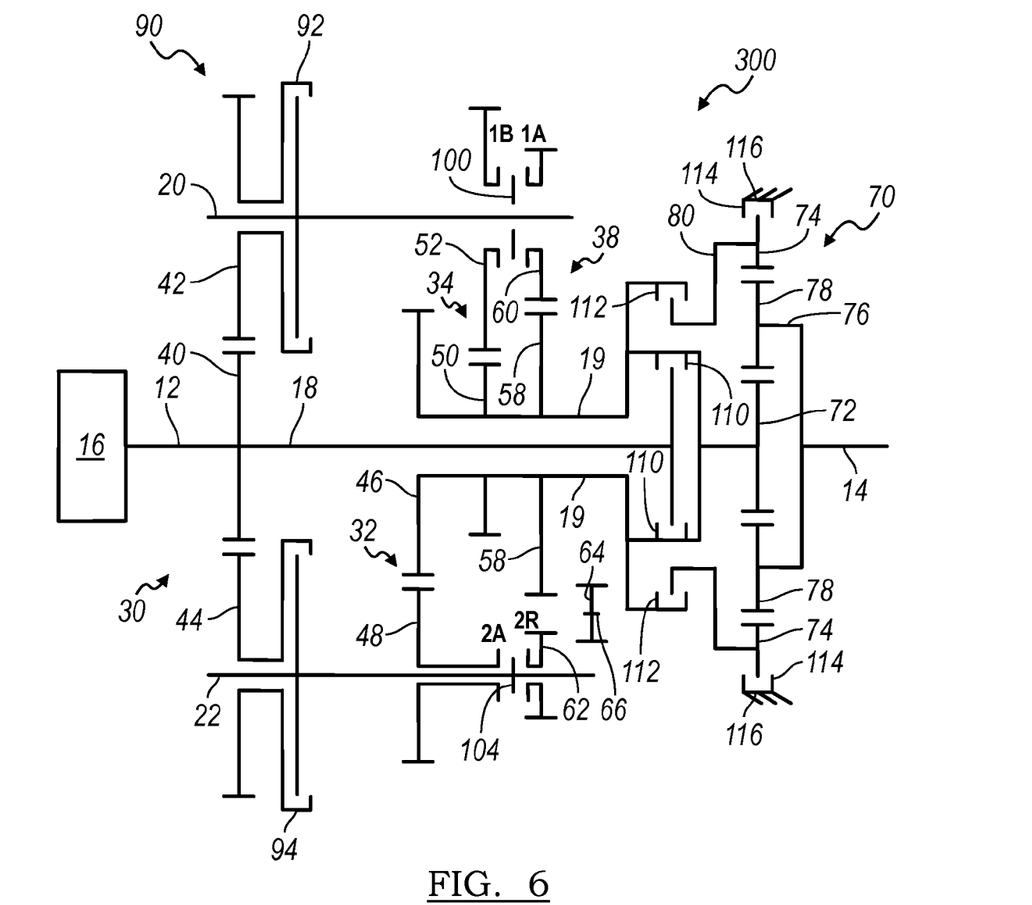
FIG. 6 is a diagrammatic view of another eight speed embodiment of the transmission according to the principles of the present invention.

Turning now to FIG. 6, an alternate embodiment of the transmission 10 is shown and generally indicated by reference number 300. The transmission 300 is similar to the transmission 10 and accordingly like parts are indicated by like reference numbers. However, the transmission 300 does not include the fourth co-planar gear set 36 and the third synchronizer 104. As described in FIG. 1, the second synchronizer 102 in the transmission 300 may be translated or moved to the left (position 2A in FIG. 6) to synchronize the speed of the second countershaft 22 with the speed of gear 48 and couple it thereto. However, the second synchronizer 102 in transmission 300 may also be translated or moved to the right (position 2R in FIG. 6) to synchronize the speed of the second countershaft 22 with the speed of gear 62 and couple it thereto.

Figure 7:
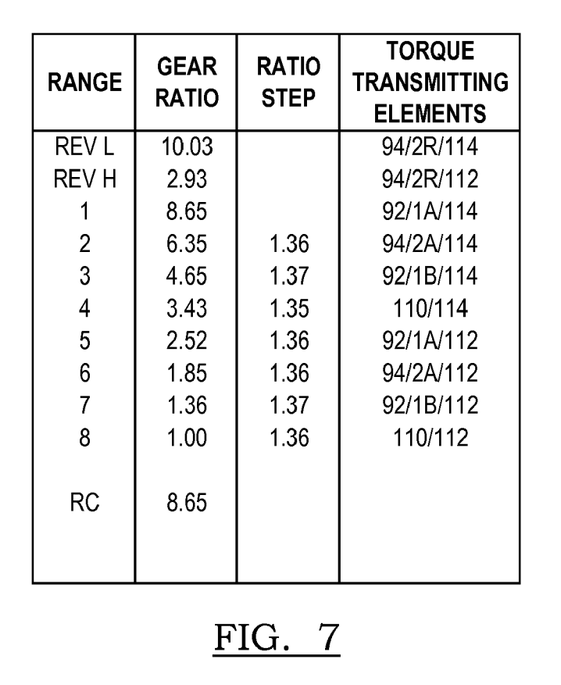
FIG. 7 is a chart listing the torque transmitting elements that are engaged to achieve exemplary gear ratios and step ratios for the eight speed embodiment illustrated in FIG. 6 of the present invention.

With reference to FIGS. 6 and 7, the transmission 300 is an 8-speed transmission with no overdrive and is operable to provide at least eight forward speed or torque ratios and at least two reverse speed or torque ratios. FIG. 7 is a truth table presenting the various combinations of the torque-transmitting mechanisms that are activated or engaged to achieve the eight forward speed or torque ratios and the two reverse speed or torque ratios in the 8-speed transmission 300. In the particular example provided, "1A", "1B", "2A", and "2R" refer to the positions of the synchronizers 100, 104 as described above and illustrated in FIG. 6. Actual numerical gear ratios of the various gear states are also presented although it should be appreciated that these numerical values are exemplary only and that they may be adjusted over significant ranges to accommodate various applications and operational criteria of the transmission 300. An example of the gear ratios that may be obtained using the embodiments of the present invention are also shown in FIG. 7. Of course, other gear ratios are achievable depending on the gear diameter, gear teeth count and gear configuration selected.

Figure 8:
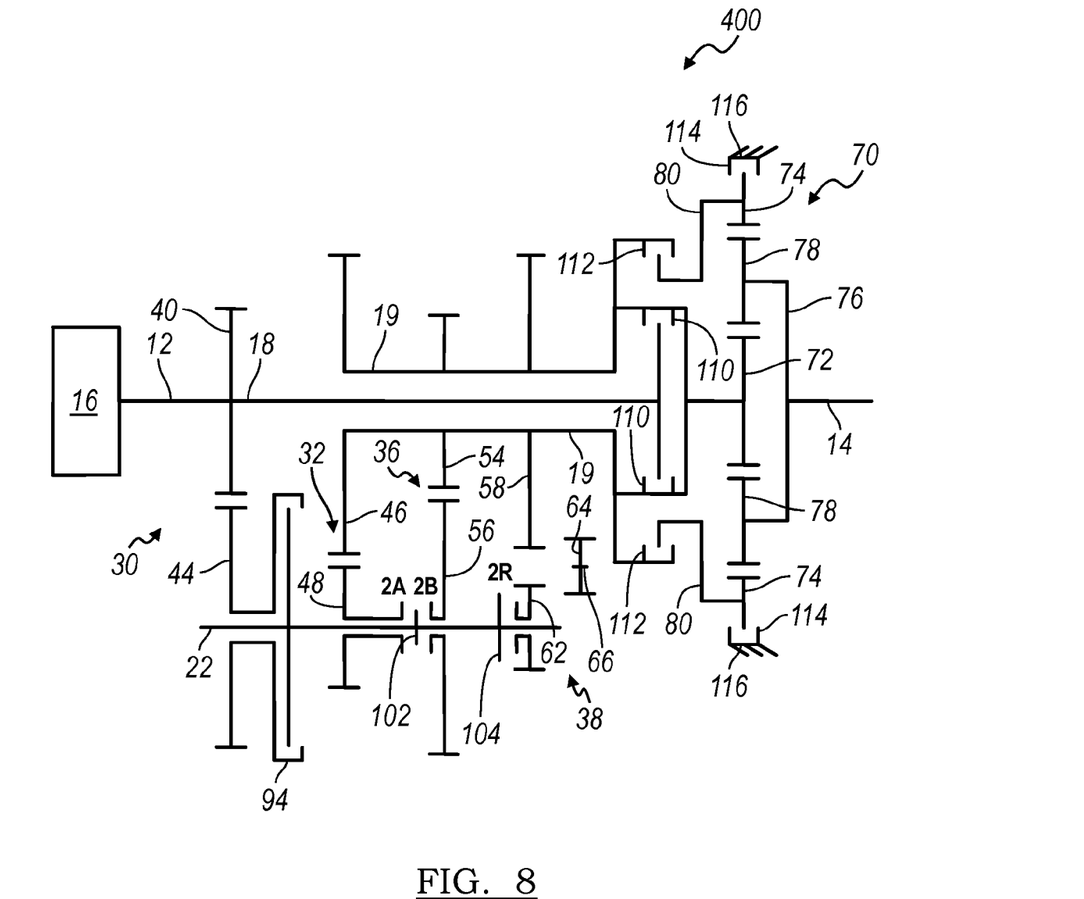
FIG. 8 is a diagrammatic view of a six speed embodiment of the transmission according to the principles of the present invention.

Turning now to FIG. 8, an alternate embodiment of the transmission 10 is shown and generally indicated by reference number 400. The transmission 400 is similar to the transmission 10 and accordingly like parts are indicated by like reference numbers. However, the transmission 400 does not include the first countershaft 20, the first clutch 92, the first synchronizer 100, the third gear set 34, and the fifth gear set 38.

Figure 9:
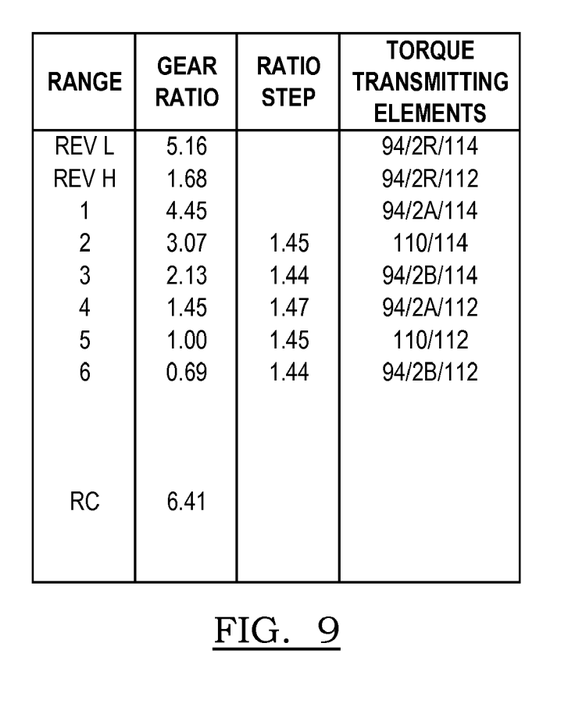
FIG. 9 is a chart listing the torque transmitting elements that are engaged to achieve exemplary gear ratios and step ratios for the six speed embodiment of the transmission of the present invention.

With reference to FIGS. 8 and 9, the transmission 400 is a 6-speed transmission and is operable to provide at least six forward speed or torque ratios and at least two reverse speed or torque ratios. FIG. 9 is a truth table presenting the various combinations of the torque-transmitting mechanisms that are activated or engaged to achieve the six forward speed or torque ratios and the two reverse speed or torque ratios in the 6-speed transmission 400. In the particular example provided, "2A", "2B", and "2R" refer to the positions of the synchronizers 102, 104 as described above and illustrated in FIG. 8. Actual numerical gear ratios of the various gear states are also presented although it should be appreciated that these numerical values are exemplary only and that they may be adjusted over significant ranges to accommodate various applications and operational criteria of the transmission 400. An example of the gear ratios that may be obtained using the embodiments of the present invention are also shown in FIG. 9. Of course, other gear ratios are achievable depending on the gear diameter, gear teeth count and gear configuration selected.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   a gearing arrangement including a first gear set, a second gear set, a third gear set and a first countershaft, wherein the first gear set is selectively connectable to the first countershaft and the third gear set includes an idler gear;
   a planetary gear set having a first member, a second member, and a third member;
   a first interconnecting member continuously interconnected to the input member;
   a second interconnecting member continuously interconnected to the first, second, and third gear sets;
   a third interconnecting member continuously interconnected to the third member of the planetary gear set;
   four torque transmitting devices each selectively engageable to interconnect at least one of the interconnecting members, the first countershaft and the first, second and third members of the planetary gear set with at least another one of the interconnecting members, the first countershaft and a stationary member;
   two synchronizers, wherein a first of the two synchronizers selectively couples the first gear set and at least one of the second and third gear sets with the first countershaft; and
   wherein the torque-transmitting mechanisms and synchronizer are selectively engageable in combinations of at least two to establish at least eight forward speed ratios and at least one reverse speed ratio between the input member and the output member.

2. The transmission of claim 1 wherein a first of the four torque transmitting devices is selectively engageable to interconnect the input member with the first countershaft.

3. The transmission of claim 2 wherein a second of the four torque transmitting devices is selectively engageable to interconnect the first interconnecting member with the second interconnecting member.

4. The transmission of claim 3 wherein a third of the four torque transmitting devices is selectively engageable to interconnect the second interconnecting member with the third interconnecting member.

5. The transmission of claim 4 wherein a fourth of the four torque transmitting devices is selectively engageable to interconnect the third member of the planetary gear set with a stationary member.

6. The transmission of claim 5 wherein the first of the two synchronizers selectively connects at least one of the first gear set and the second gear set with the first countershaft.

7. The transmission of claim 6 wherein a second of the two synchronizers selectively connects the third gear set to the first countershaft.

8. The transmission of claim 5 further comprising a fifth torque transmitting device and a second countershaft wherein the fifth torque transmitting device is selectively engageable to interconnect the input member with the second countershaft.

9. The transmission of claim 8 wherein the first of the two synchronizers selectively connects at least one of the first gear set and the third gear set with the first countershaft and a second of the two synchronizers selectively connects at least one of the second gear set and the third gear set to the second countershaft.

10. The transmission of claim 1 wherein the first, second and third gear sets are co-planar gear sets each including at least a first gear intermeshed with a second gear.

11. The transmission of claim 10 wherein the first gears of the first, second and third gear sets are continuously interconnected with the second interconnecting member.

12. The transmission of claim 11 wherein the second gears of the first, second and third gear sets are selectively connectable with the first countershaft.

13. The transmission of claim 12 further comprising a second countershaft selectively connectable to the input member wherein the second gear of the third gear set is continuously connected to the second countershaft.

14. The transmission of claim 10 wherein the second gears of the first and third gear sets are selectively connectable with the first countershaft.

15. The transmission of claim 14 further comprising a second countershaft selectively connectable to the input member wherein the third gear set includes a third gear and the second gear of the second gear set and the third gear of the third gear set are selectively connected to the second countershaft.

16. The transmission of claim 1 wherein the first member of the planetary gear set is a sun gear member, the second member is a planet carrier member, and the third member is a ring gear member.

17. A transmission comprising:
   an input member;
   an output member;
   a gearing arrangement including a first gear set, a second gear set, a third gear set and a first countershaft, wherein the first gear set is selectively connectable to the first countershaft and the third gear set includes an idler gear;
   a planetary gear set having a first member, a second member, and a third member;
   a first interconnecting member continuously interconnected to the input member;
   a second interconnecting member continuously interconnected to the first, second, and third gear sets;
   a third interconnecting member continuously interconnected to the third member of the planetary gear set;
   a first torque transmitting device selectively engageable to interconnect the input member with the first countershaft;
   a second torque-transmitting device selectively engageable to interconnect the first interconnecting member with the second interconnecting member;
   a third torque-transmitting device selectively engageable to interconnect the second interconnecting member with the third interconnecting member;
   a fourth torque-transmitting device selectively engageable to interconnect the third member of the planetary gear set with a stationary member;

two synchronizers, wherein a first of the two synchronizers selectively couples the first gear set and at least one of the second and third gear sets with the first countershaft; and wherein the torque-transmitting mechanisms and the synchronizers are selectively engageable in combinations of at least two to establish at least eight forward speed ratios and at least one reverse speed ratio between the input member and the output member.

18. The transmission of claim 17 wherein the first member of the planetary gear set is a sun gear member, the second member is a planet carrier member, and the third member is a ring gear member.

19. The transmission of claim 17 wherein the first, second and third gear sets are co-planar gear sets each including at least a first gear intermeshed with a second gear.

20. The transmission of claim 19 wherein the second gears of the first and third gear sets are selectively connectable with the first countershaft.

21. The transmission of claim 20 wherein the first gears of the first second and third gear sets are continuously interconnected with the second interconnecting member, the first of the two synchronizers selectively connects the second gears of at least one of the first gear set and the second gear set with the first countershaft and a second of the two synchronizers selectively connects the second gear of the third gear set to the first countershaft.

22. The transmission of claim 21 further comprising a second countershaft selectively connected to the input member by a fifth torque transmitting device wherein the third gear set further includes a third gear intermeshed with the first gear of the third gear set and the third gear is rotatably connected to the second countershaft.

23. The transmission of claim 20 further comprising a second countershaft selectively connected to the input member by a fifth torque transmitting device wherein the third gear set further includes a third gear intermeshed with the first gear of the third gear set and the first of the two synchronizers selectively connects the second gear of at least one of the first gear set and the third gear set with the first countershaft and a second of the two synchronizers selectively connects at least one of the second gear of the second gear set and the third gear of the third gear set to the second countershaft.

24. A transmission comprising:
an input member;
an output member;
a gearing arrangement including a first gear set, a second gear set, a third gear set and a first countershaft, wherein each gear set includes a first gear intermeshed with a second gear, the first gears of the first and third gear set are selectively connectable to the first countershaft and the third gear set includes an idler gear;
a planetary gear set having a sun gear member, a planet carrier member, and a ring gear member;
a first interconnecting member continuously interconnected to the input member;
a second interconnecting member continuously interconnected to the first, second, and third gear sets;
a third interconnecting member continuously interconnected to the third member of the planetary gear set;
a first torque transmitting device selectively engageable to interconnect the input member with the first countershaft;
a second torque-transmitting device selectively engageable to interconnect the first interconnecting member with the second interconnecting member;
a third torque-transmitting device selectively engageable to interconnect the second interconnecting member with the third interconnecting member;
a fourth torque-transmitting device selectively engageable to interconnect the ring gear member of the planetary gear set with a stationary member;
two synchronizers, wherein a first of the two synchronizers selectively couples the first gear set and at least one of the second and third gear sets with the first countershaft; and wherein the torque-transmitting mechanisms and the synchronizers are selectively engageable in combinations of at least two to establish at least eight forward speed ratios and at least one reverse speed ratio between the input member and the output member.

25. The transmission of claim 24 wherein the first gears of the first second and third gear sets are continuously interconnected with the second interconnecting member, the first of the two synchronizers selectively connects the second gears of at least one of the first gear set and the second gear set with the first countershaft and a second of the two synchronizers selectively connects the second gear of the third gear set to the first countershaft.

26. The transmission of claim 25 further comprising a second countershaft selectively connected to the input member by a fifth torque transmitting device wherein the third gear set further includes a third gear intermeshed with the first gear of the third gear set and the third gear is rotatably connected to the second countershaft.

27. The transmission of claim 24 further comprising a second countershaft selectively connected to the input member by a fifth torque transmitting device wherein the third gear set further includes a third gear intermeshed with the first gear of the third gear set and the first of the two synchronizers selectively connects the second gear of at least one of the first gear set and the third gear set with the first countershaft and a second of the two synchronizers selectively connects at least one of the second gear of the second gear set and the third gear of the third gear set to the second countershaft.

* * * * *